United States Patent [19]

Mitomi

[11] Patent Number: 4,762,437
[45] Date of Patent: Aug. 9, 1988

[54] FASTENER

[75] Inventor: Seiji Mitomi, Yokohama, Japan

[73] Assignee: Nifco Inc., Yokohama, Japan

[21] Appl. No.: 24,263

[22] Filed: Mar. 10, 1987

[30] Foreign Application Priority Data

Mar. 31, 1986 [JP] Japan .................................. 61-48243

[51] Int. Cl.⁴ .............................................. F16B 19/00
[52] U.S. Cl. ............................... 403/406.1; 403/405.1;
403/348; 411/349; 411/508; 411/510; 411/549;
411/913; 24/297
[58] Field of Search ................ 411/349, 549, 553–555,
411/508–510, 15, 913, 182; 174/138 D; 24/297;
403/408.1, 405.1, 406.1, 348

[56] References Cited

U.S. PATENT DOCUMENTS

| 3,568,263 | 3/1971 | Meehan ........................... 411/553 X |
| 3,893,208 | 7/1975 | Yuda ........................... 174/138 D X |
| 4,208,944 | 6/1980 | Moryl ............................. 411/182 X |
| 4,373,826 | 2/1983 | Inamoto et al. ............. 403/406.1 X |
| 4,422,222 | 12/1983 | Notoya ........................... 411/349 X |
| 4,524,494 | 6/1985 | Sato et al. ......................... 24/297 X |
| 4,652,192 | 3/1987 | Schaller ......................... 411/508 X |

FOREIGN PATENT DOCUMENTS

| 2901213 | 7/1980 | Fed. Rep. of Germany ... 174/138 D |
| 1493590 | 7/1967 | France .................................. 411/510 |
| 1271400 | 7/1969 | United Kingdom ........... 174/138 D |
| 1256295 | 12/1971 | United Kingdom ................. 411/553 |
| 2125100 | 2/1984 | United Kingdom ........... 174/138 D |
| 2134965 | 8/1984 | United Kingdom ................ 403/405 |

Primary Examiner—Lloyd A. Gall
Assistant Examiner—Curtis B. Brueske
Attorney, Agent, or Firm—Trexler, Bushnell, Giangiorgi & Blackstone, Ltd.

[57] ABSTRACT

A fastener snaps through aligned apertures in two work pieces. The shape of the aperture in the first work piece is such that the fastener cannot be withdrawn from it. However, the aperture in the second work piece is so shaped that the fastener can be rotated for removal of the fastener from the second work piece. The work pieces thereby can be separated, but the fastener remains in substantially permanent association with the first work piece for reuse of the work piece and the fastener.

1 Claim, 10 Drawing Sheets

FASTENER

BACKGROUND OF THE INVENTION

This invention relates to a one-piece fastener formed of plastic.

Conventionally, as a means to fix various parts easily and solidly to a body side, many one-piece fasteners formed of plastic are employed.

Figure 17:
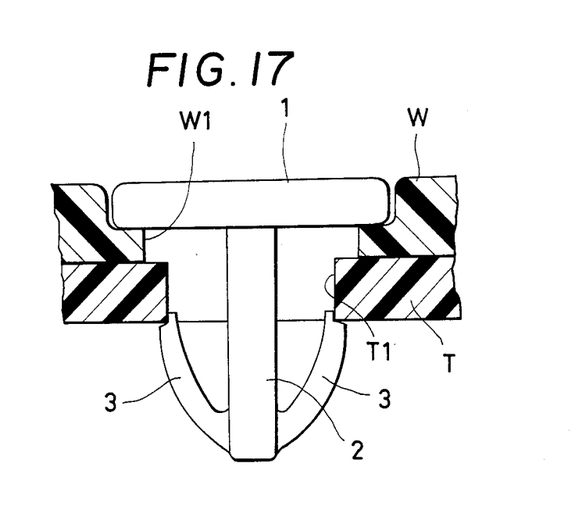
FIGS. 17 and 18 are sectional views showing the conventional embodiments.
Figure 18:
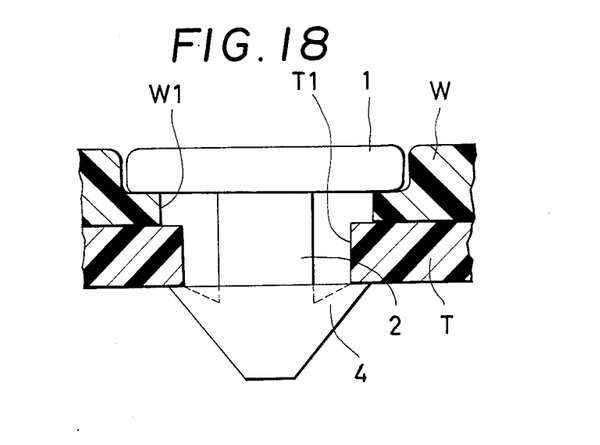

Generally, with respect to a fastener of these kinds, as shown in FIGS. 17 and 18, a leg 2 is projected from a base member 1, and from the top of which, an elastic deformable anchor type elastic engaging portion 3 as in FIG. 17 and umbrella type elastic engaging portion 4 as in FIG. 18 are projected. When these elastic engaging portions 3 and 4 are forcely inseted into a hole W1 provided in a fitting part W and a fixing hole T1 provided in a body T, it is fixed and impossible to slip off owing to the elastic restitution force of the elastic engaging portions 3 and 4.

However, certain parts such as a finish plate, a kick plate and a cowl top grille of automotive vehicles for example must be reattached after removal from a car body to which they were once fixed, in order to exchange or to repair the inner parts.

Accordingly, as is apparent from FIGS. 17 and 18, it was difficult when the conventional fastener was once fixed remove it from the external side, and if it was drawn out forcibly, the fastener was damaged and impossible to reuse.

And when the conventional fastener is drawn out from the hole T1 of the body T, it is also detached from the hole W1 of the fitting part W, the fitting part W and fastener are separated, which often leads to the loss of the fastener (as it is small).

SUMMARY OF THE PRESENT INVENTION

The purpose of this invention is to provide a one-piece fastener formed the of plastic which eliminates above disadvantages, enables the fastener to be easily detatched from and reattached to the adapting hole of the body, without ever being separated from the part or work piece when detached from the fixing hole whereby the fastener maybe reused repeatedly.

BRIEF DESCRIPTION OF THE DRAWINGS

A better understanding of the present invention will be had upon reference to the following detailed description when read conjunction with the accompanying drawings wherein like reference characters refer to like parts throughout the several views, and in which.

DESCRIPTION OF THE INVENTION

A preferred embodiment of the present invention will be explained with reference to the drawings.

Figure 1:
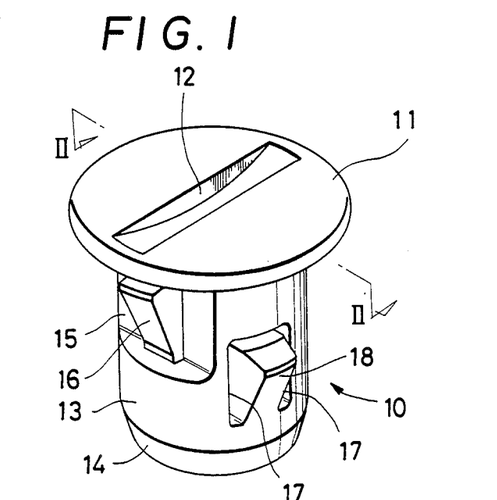
FIG. 1 is a perspective view illustrating a preferred embodiment of the present invention.
Figure 2:
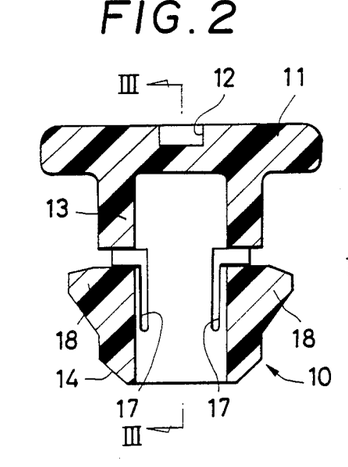
FIG. 2 is a sectional view taken substantially along line 2—2 in FIG. 1.
Figure 3:
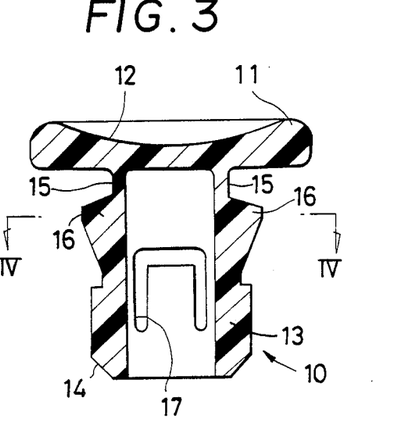
FIG. 3 is a sectional view taken substantially along line 3—3 in FIG. 2.

FIGS. 1, 2 and 3 shows an embodiment of the present invention.

In the drawings, 10 is a fastener, at the end of which, a disk shaped base member 11 is provided.

On one side of the member 11, a groove 12 is provided along diameter direction to enable the fastener to be rotated with a screw-driver or a coin.

At the another side of the base member 11, there is projected a cylindrical hollow main body 13 having an axial bore therein. The periphery of said under end of the main body 13 includes a tapered portion 14 being tapered off toward the free end.

Figure 4:
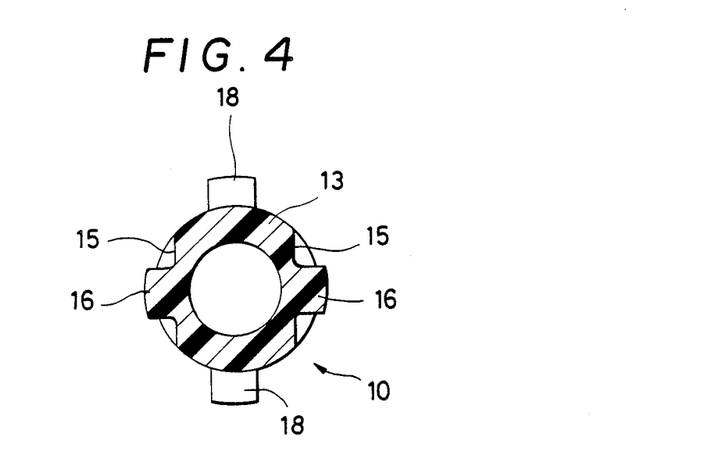
FIG. 4 is a sectional view taken substantially along line 4—4 in FIG. 3.

At opposite sides of the peripheral of the upper half of the main body 13, plane or flat portions 15,15 parallel to each other are formed. The plane portion 15 has, as shown in FIG. 4, a thickness gradually diminishing toward the center in transverse direction. At the center the plane portions 15 are formed first engaging portions 16 having an outwardly and upwardley incline surface so as to have a height which increases degree from a lower end of the plane portion 15 toward an upper end. The engaging portion presents an upwardly facing shoulder or end which projects a little more than outside diameter of the main body 13 as shown in FIGS. 3 and 4.

At the lower half of main body 13, the second engaging portions 18,18 are formed by slits 17, 17, at the portions offset 90 degrees around the cylindrical body 13 from the two first engaging portions 16,16. These second engaging portion 18,18 also have upwardly and outwardly inclined side surfaces so that their height increases by degrees upwardly for presenting upwardly facing and outwardly projecting shoulders.

The fastener 10 is formed in one-piece plastic from resiliant plastic with a thickness at the thin plane portion 15 and the second engaging member 18 surrounded by the slit 17 so as to bend inwardly to provide sufficient power of elastic restitution.

Now the manner of using the fastener having the above-mentioned structure will be explained.

Figure 5:
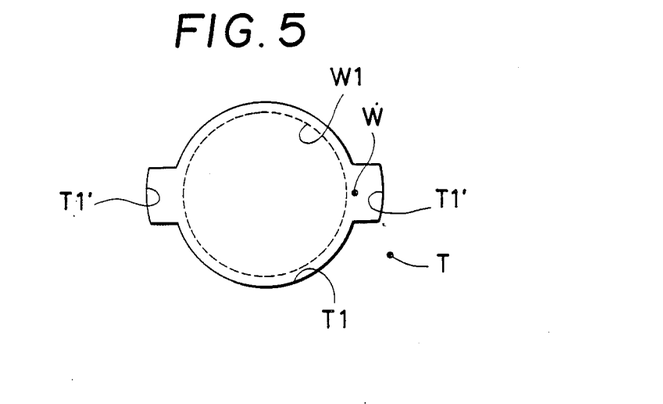
FIG. 5 is a plan view illustrating a fixing hole and a fixing hole part of the body of a preferred embodiment of the present invention.

The fitting part work piece W is provided with a round hole W1 having a slightly larger inside diameter than the outside diameter of the main body 13 of the fastener 10 (shown with dotted lines in FIG. 5). A body T to which the work piece is to be secured is provided with a round fixing hole T1 having an inside diameter slightly larger than that of the hole W1. In addition notches T1′,T1′ are provided in the body at two positions offset 180 degrees around the fixing hole (shown with a solid line in FIG. 5.).

Figure 6A:
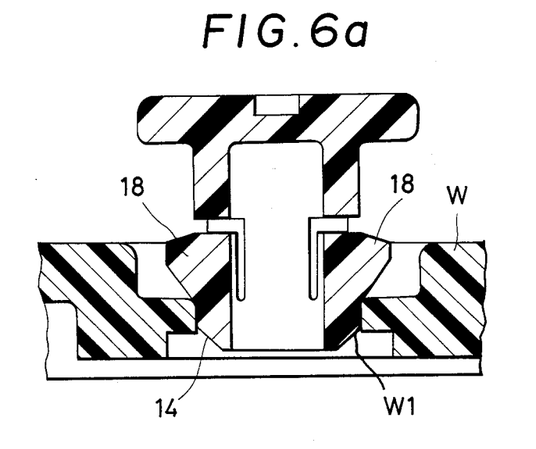
FIGS. 6, 7, 8 and 9 are sectional views showing the fastener in progressive conditions of being assembled with a work piece and a body, (a) and (b) of each Figure thereof being turned 90 degrees from each other.
Figure 6B:
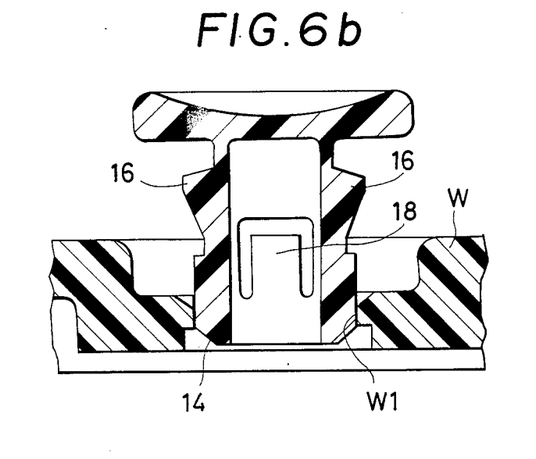
Figure 7A:
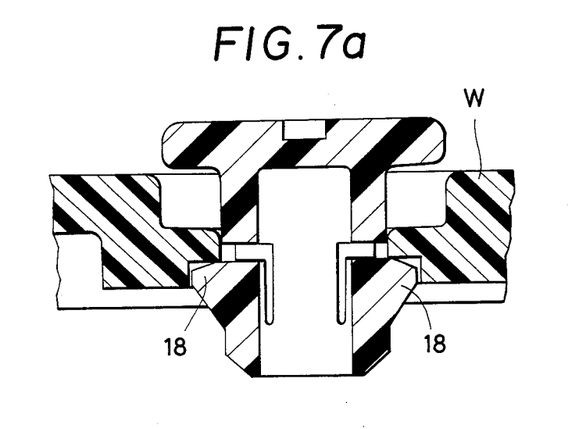
Figure 7B:
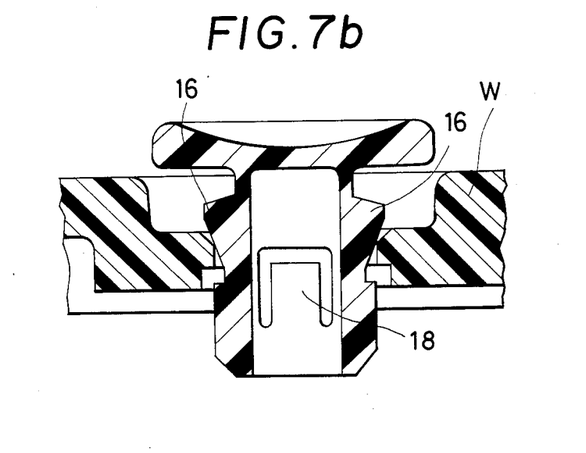

As shown in FIGS. 6(a) and 6(b), the tapered portion 14 is first inserted into the hole W1 of the fitting part W, with the second engaging members 18,18 reaching to the periphery or edge of the hole W1. Upon continued insertion, the second engaging portions 18,18 are bent or flexed inwardly, and as shown in FIG. 7, after passing through the hole W1, they elastically spring back to their original positions. At this moment, the first engaging members 16,16 reach to the periphery or edge of the hole W1.

As the insertion process continues; the plane portions 15,15 are bent or flexed inwardly to permit the engaging members 16, 16 to pass through the hole W1. After the first engaging members 16,16 pass through the hole W1, the plane portions 15,15 spring back to their original positions. Thus, as shown in FIG. 8, the fitting part W is fixed between the first engaging portions 16,16 and base member 11 so that it is impossible for the fastener to be disconnected from the part or work piece W.

Figure 8A:
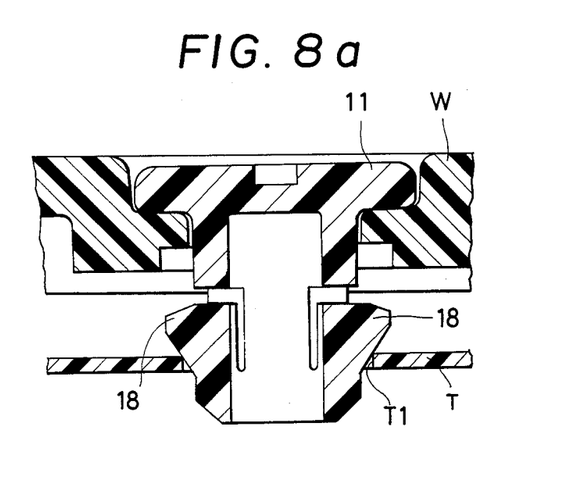
Figure 8B:
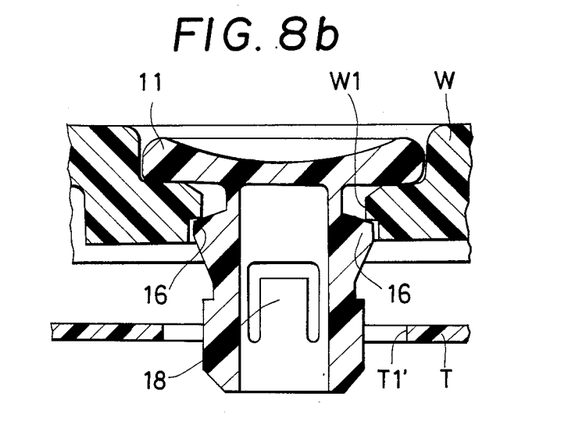
Figure 9A:
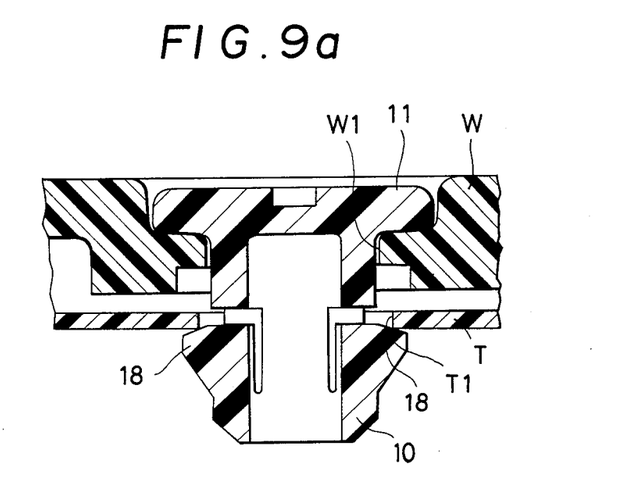
Figure 9B:
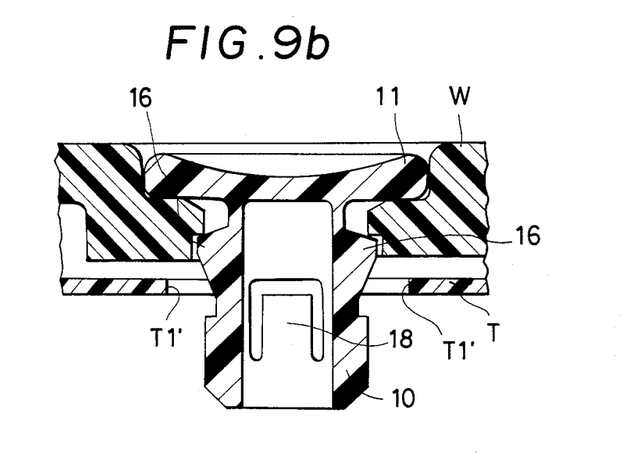

Next, as shown in FIGS. 8(a) and 8(b), the main body 13 of the fastener 10 is inserted into the fixing hole T1 of the body T, where the position of the second engaging members 18, 18 are offset 90 degrees from the notches T1',T1'. Then, as the second engaging members 18,18 are bent inwardly, they pass through the fixing hole T1, and they elastically spring back to their original positions. Thus, as shown in FIG. 9, fitting part W is fixed to the body T by the fastener 10.

Figure 10:
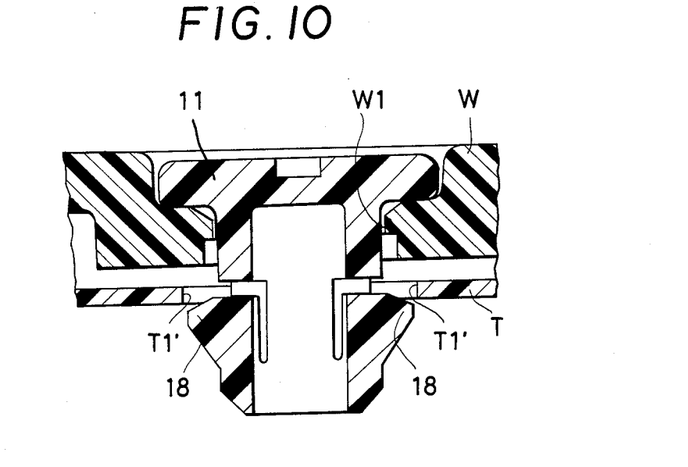
FIGS. 10 and 11 are sectional views showing conditions when the parts are detatched from the body.
Figure 11:
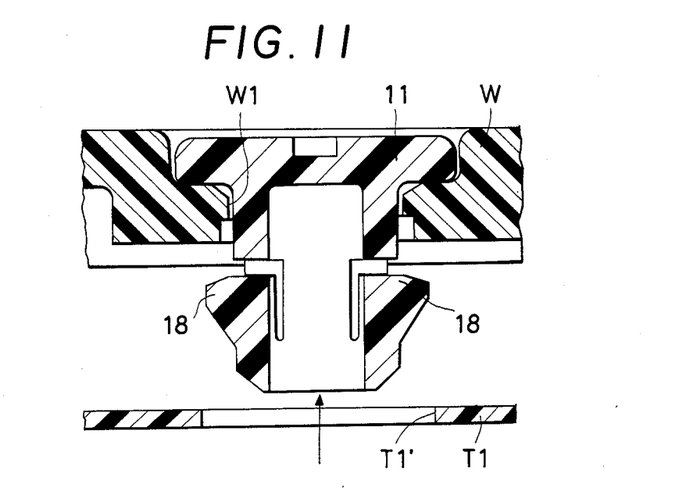

When the fitting part is to be disconnected from the body T, a screw-driver or a coin is inserted and manipulated in the groove 12 of the base member 11 for turning the fastener 10 by 90 degrees, to bring the element 18 into alignment with the notches T1' in the engaging hole T1 of the body T as shown in FIG. 10. Then when the fitting part W is lifted upward, as shown in FIG. 11, as the second engaging members 18,18 pass through the notches T1',T1' to disconnect the fitting part W from the body T, the fastener 10 remains fixed to the fitting part W by the flange portion 11 and the first engaging portions 16,16. Accordingly, when the fitting part W is fixed again to the body T, it is pushed in again as shown in FIGS. 8(a) and 8(b), or after being inserted to the position shown at FIG. 10 the fastener 10 is turned to engage the elements 18,18 beneath the body T.

While a prefered embodiment of the present invention is explained as above, modification is available of any of the parts.

Figure 12A:
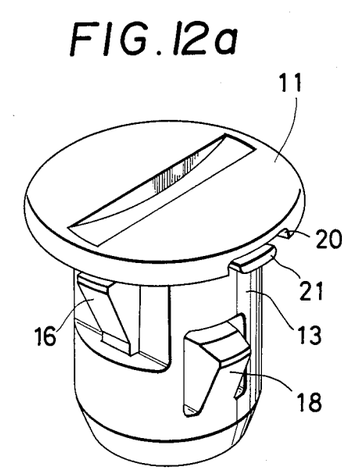
FIG. 12(a) is a perspective view showing another preferred embodiment of this invention.
Figure 12B:
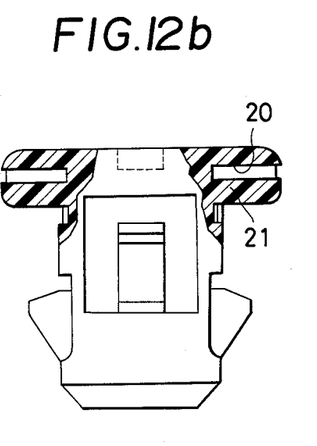
FIG. 12(b) is a side view partially in section.

For example, in another embodiment shown in FIG. 12(a) and 12(b), a notch 20 is provided at the end of the lower side of the base member 11, and an insertion part or finger 21 projects thereunder from the main body 13.

Figures 13, 14:
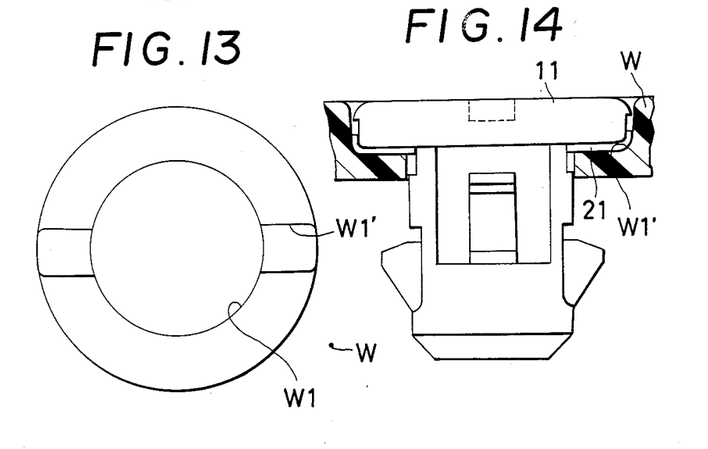
FIG. 13 is a plan view illustrating a hole periphery portion of the fixing plate or work piece.
FIG. 14 is a side view showing an attached condition of the embodiment of FIG. 12.

In this embodiment, as shown in FIG. 13, fitting grooves W1' are formed in the part W, into which the insertion parts 21 fit at the upper end of the hole W1 of the fitting part W. When the part W is assembled with the fastener 10, as shown in FIG. 14, insertion part 21 is inserted into the fitting groove W1' of the upper end of the hole W1 of the fitting part W. Therefore, the fastener is prevented from slipping out from the fixing hole T1 of the body T by an inadvertent turn.

When the fastener 10 is to be drawn out from the fixing hole T1, the user can only turn the fastener 10 by first elastically flexing the fitting part 21 so as to disengage from groove W1'.

Figure 15:
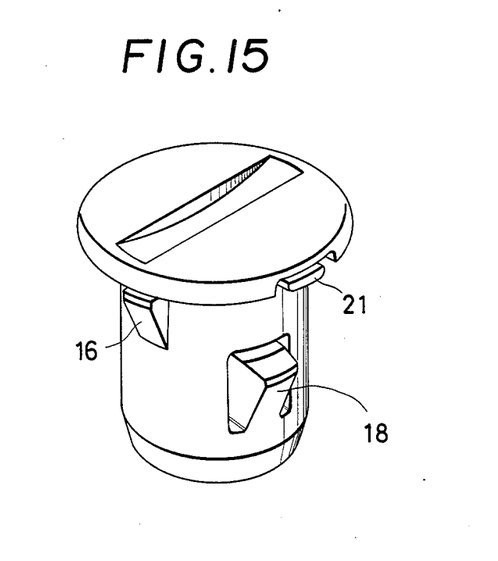
FIG. 15 is a perspective view illustrating another embodiment of this invention.
Figure 16:
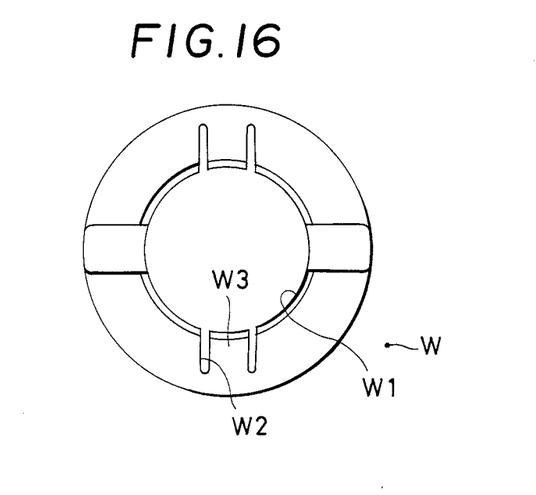
FIG. 16 is a plan view of a hole periphery portion of the fixing plate.

And, as shown in FIG. 15, it is also contemplated to provide the first engaging member 16,16 directly on the periphery of the main body 13 without providing the plane portions 15,15 (refer to FIG. 1). In this case, as shown in FIG. 16, providing an elastic tongue W3 formed by slits W2 at the edge of the hole W1 of the fitting parts W, the elastic tongues are to be bent when the fastener is inserted.

It is of course contemplated that various modifications besides those prescribed may be provided. For example, the number of the first and second engaging member 16 and 18 may also be changed to more than 2 or only 1, rather than 2. And the form of a hole W1 and a fixing hole T1 may be changed accordingly. And it is also contemplated to provide a projection (not illustrated) instead of the groove 12 on the base member and to turn it with pressure.

The fastener of this invention is so constructed as above that in case it is necessary to detach or reattach the fixing parts, they can easily be detached and can be reused to reattach. And as the fastener and fitting part are not separated when detached, the fastener may never be lost when during reattachment.

I claim:

1. The combination comprising a one-piece resilient plastic fastener and a first work piece and a second work piece having respective first and second apertures therethrough, said apertures being aligned and said fastener extending through both of said apertures and detachably retaining said work pieces in close confronting assembled relation, said first aperture being substantially circular and said second aperture being substantially circular with a radial extension therefrom, said fastener including a base member and a main body having a main axis and extending axially from said base member and through said apertures, said base member having means thereon for rotating said fastener about said main body axis, said main body having a first resiliently displaceable engaging member projecting laterally from said main body and spaced a first predetermined distance axially along said main body from said base member and non-releasably snapped through said first aperture and axially engaging said first work piece to retain said fastener in assembled relation with said first work piece, and a second laterally displaceable engaging member spaced circumferentially from said first engaging member and spaced axially from said base member a second predetermined distance greater than said first predetermined distance and axially engaged said second work piece to hold said second work piece in assembled relation with said first work piece, rotation of said fastener aligning said second engaging member with the radial extension of said second aperture to permit said second work piece to be separated from said fastener and said first work piece, said fastener remaining in assembled relation with said first work piece for subsequent reuse.

* * * * *